United States Patent [19]

Janowicz

[11] Patent Number: 4,955,704
[45] Date of Patent: * Sep. 11, 1990

[54] SHIFTABLE OUTSIDE REARVIEW MIRROR FOR USE ON VEHICLES

[76] Inventor: Miroslaw Janowicz, 1000 Berlin 62, Schöneberg, 46, Feurigstrasse, Fed. Rep. of Germany

[ * ] Notice: The portion of the term of this patent subsequent to Dec. 20, 2005 has been disclaimed.

[21] Appl. No.: 366,235

[22] Filed: Jun. 12, 1989

Related U.S. Application Data

[63] Continuation of Ser. No. 183,590, Apr. 19, 1988, abandoned, which is a continuation of Ser. No. 910,218, filed as PCT DE86/00098 on Mar. 7, 1986 published as WO86/05148 on Sep. 12, 1986, Pat. No. 4,792,220.

[30] Foreign Application Priority Data

Mar. 8, 1985 [DE] Fed. Rep. of Germany ....... 3508348
Oct. 3, 1985 [DE] Fed. Rep. of Germany ........... 35359

[51] Int. Cl.$^5$ .................... G02B 5/08; H01H 3/16; H01H 9/00
[52] U.S. Cl. ................... 350/637; 350/605; 200/61.27; 200/61.54
[58] Field of Search ............. 200/4.5 R, 52 R, 61.27, 200/61.54, 61.85, 61.87, 61.88, 302.1, 335; 350/278–281, 289, 631, 632, 636, 637

[56] References Cited

U.S. PATENT DOCUMENTS

| 3,199,075 | 8/1965 | Simmons | 350/637 X |
|---|---|---|---|
| 3,486,811 | 12/1969 | Russell | 350/637 |
| 3,603,748 | 9/1971 | Cryer | 200/61.27 |
| 3,830,561 | 8/1974 | La Fave et al. | 350/637 |
| 4,027,953 | 6/1977 | Jacob | 350/637 |
| 4,144,424 | 3/1979 | Takeda et al. | 200/61.85 |
| 4,428,649 | 1/1984 | Main et al. | 350/637 |
| 4,488,777 | 12/1984 | Bauer et al. | 350/279 |
| 4,792,220 | 12/1988 | Janowicz | 200/61.54 X |

FOREIGN PATENT DOCUMENTS

| 2431869 | 1/1976 | Fed. Rep. of Germany . |
| 3149535 | 7/1983 | Fed. Rep. of Germany . |
| 3341426 | 5/1985 | Fed. Rep. of Germany . |
| 2148814 | 6/1985 | United Kingdom . |

Primary Examiner—J. R. Scott
Attorney, Agent, or Firm—Krass & Young

[57] ABSTRACT

This invention relates to a shiftable outside mirror for use on a motor vehicle having a turn signal lever arm to eliminate a driver's blind spot. The turn signal lever arm is provided with a switch at its free end. The invention comprises a switch capable of being articulated about the end of the turn signal lever arm from a rest position in a plane parallel to the plane of motion of the turn signal lever arm to an activated position in which the position of the mirror is altered. The switch is moved counter-clockwise to shift a left outside mirror, and clockwise to shift a right outside mirror.

20 Claims, 2 Drawing Sheets

SHIFTABLE OUTSIDE REARVIEW MIRROR FOR USE ON VEHICLES

This application is a continuation of application Ser. No. 07/183,590, filed Apr. 19, 1988, now abandoned which is a continuation of application Ser. No. 06/910,218, filed as PCT DE86/00098 on Mar. 7, 1986 published as WO86/05148 on Sep. 12, 1986, now U.S. Pat. No. 4,792,220.

INTRODUCTION

This invention relates to outside rearview mirrors for vehicles and particularly to an outside rearview mirror which can be temporarily shifted to a wider viewing-angle position by means of a switch arrangement integrated with the vehicle turn signal lever.

BACKGROUND

It is well-known that outside rearview mirrors have the disadvantage of leaving the driver of a vehicle with a "blind spot" between the field-of-view of the mirror and the beginning of a driver's peripheral vision. Objects such as motor vehicles in the blind spot cannot be seen by the driver, creating the potential for a serious accident while changing lanes or merging with traffic. One common method for overcoming this problem is for the driver to glance over his shoulder at the blind spot to check for other vehicles. An obvious drawback of this method is that the driver is not watching where he is going for a short period of time. Another proposed solution has been the use of convex mirrors to effectively eliminate the blind spot. However, convex mirrors produce a considerable amount of image distortion and make objects look farther away than they really are. This can be more dangerous than having a blind spot, since the driver is lured into a false sense of security.

SUMMARY OF THE INVENTION

Accordingly, it is an object of the present invention to provide convenient, reliable means, in the form of a temporarily shiftable outside rearview mirror, for eliminating a vehicle driver's blind spot during lane change and merging maneuvers.

It is also an object of the present invention to provide convenient, simple means for actuating a temporarily shiftable outside rearview mirror on a vehicle in the form of a switch mechanism located on the vehicle's turn signal lever.

These and other objects which will become apparent upon a reading of the following specification and claims, are accomplished by way of a shiftable outside rearview mirror capable of being mounted on the right side, left side, or both sides of a vehicle. The switch means is located on the end of the vehicle turn signal lever, movable in the plane of motion of the turn signal lever about an axis on the turn signal lever. Electrical actuating means which cause the mirror to move in response to the activation of the switch means consists of a first circuit comprising the switch means a relay, and a control system governing the duration of the mirror shift, and a second circuit comprising a motor which rotates the mirror in two directions, two on-off switches to limit the arc of rotation of the mirror, and switch contacts actuated by the relay.

To shift a left outside rearview mirror, the driver urges the switch means in a counter-clockwise direction, and to shift a right outside mirror, the driver urges the switch means in a clockwise direction. The control system of the first circuit in the electrical actuating means provides a minimum shift duration in response to a brief touch on the switch means and a correspondingly longer shift duration in response to a sustained pressure. The switch means moves independently of the turn signal lever for a short distance. If additional pressure is exerted on the switch means after it has reached the limit of its independent movement, then both the switch means and the turn signal lever arm will be actuated. To activate the turn signal alone, the driver must press only the turn signal lever arm in the appropriate direction.

Frequently it is necessary for a driver to deactivate the turn signal by hand, in which case he would not want to shift the mirror on the other side of the car. Means are provided with the electrical activating means which prevent the shifting of a mirror on one side of the vehicle while current is flowing to the turn signals on the opposite side.

BRIEF DESCRIPTION OF THE DRAWINGS

FIG. 4 is a schematic of the electrical actuating means according to the invention.

DETAILED DESCRIPTION OF THE DRAWINGS

In the following specification and claims specific terminology is utilized in the interests of clarity and a particular embodiment is described in accordance with the requirements of 35 USC 112, but it is to be understood that the same is not intended to be limiting, as indeed the invention is capable of many variations within the scope of the appended claims.

Figure 1:
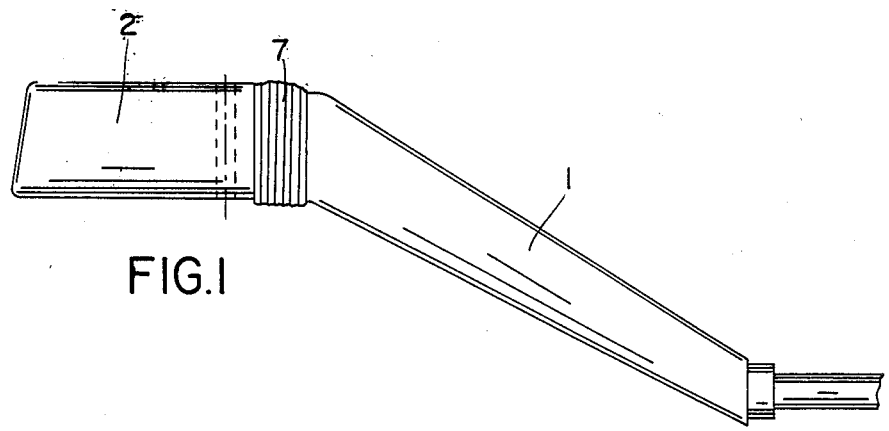
FIG. 1 is a top view of a turn signal lever arm according to the invention.
Figure 2:
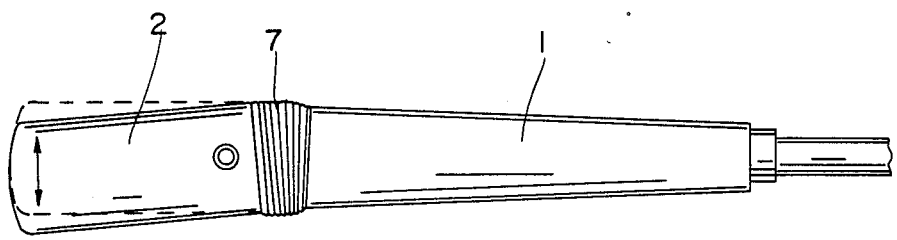
FIG. 2 is a front view of a turn signal lever arm according to the invention.
Figure 3:
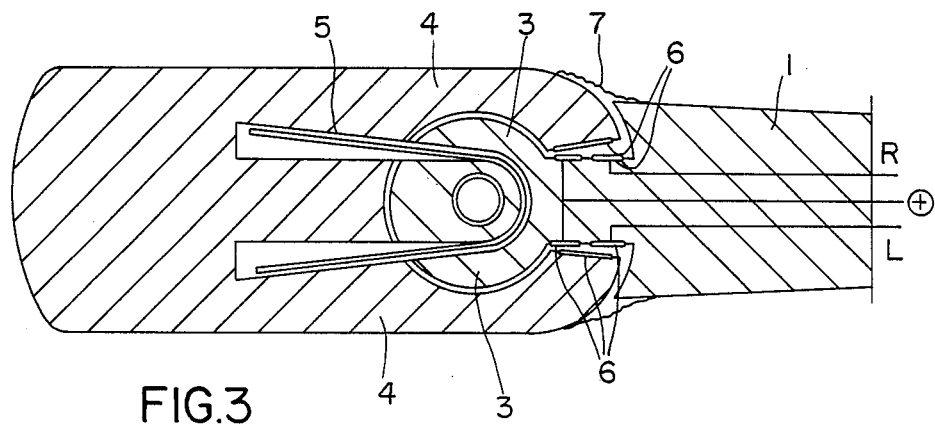
FIG. 3 is a sectional view of the left end of the turn signal lever arm according to FIG. 2.

FIGS. 1-3 show a turn signal lever arm 1 and a switch mechanism 2. Switch mechanism 2 is movably connected to lever arm by way of interfitting engagement between protruding portion 3 of lever arm 1 and spaced arm portions 4 of switch mechanism 2. Protruding portion 3 and arm portions 4 have electrical contacts 6 mounted thereon. Switch 2 is movable about protruding portion 3 for a limited distance in both the clockwise and counter-clockwise directions in a plane parallel to the plane of motion of turn signal lever arm 1, until one of the sets of contacts 6 is engaged. The letter R denotes the set of contacts 6 which will activate a mirror mounted on the right side of a vehicle, and the letter L denotes the set of contacts which will activate a mirror mounted on the left side. Additional pressure beyond what is required to actuate switch 2 will move switch 2 and lever arm 1 as a single unit. Switch 2 is biased to a neutral position out of contact with either set of contacts 6 by way of a U-shaped spring 5 having its base located in protruding portion 3 and its free ends in switch 2. Elastic cover 7 protects the electrical contacts from dirt and water.

Figure 4:
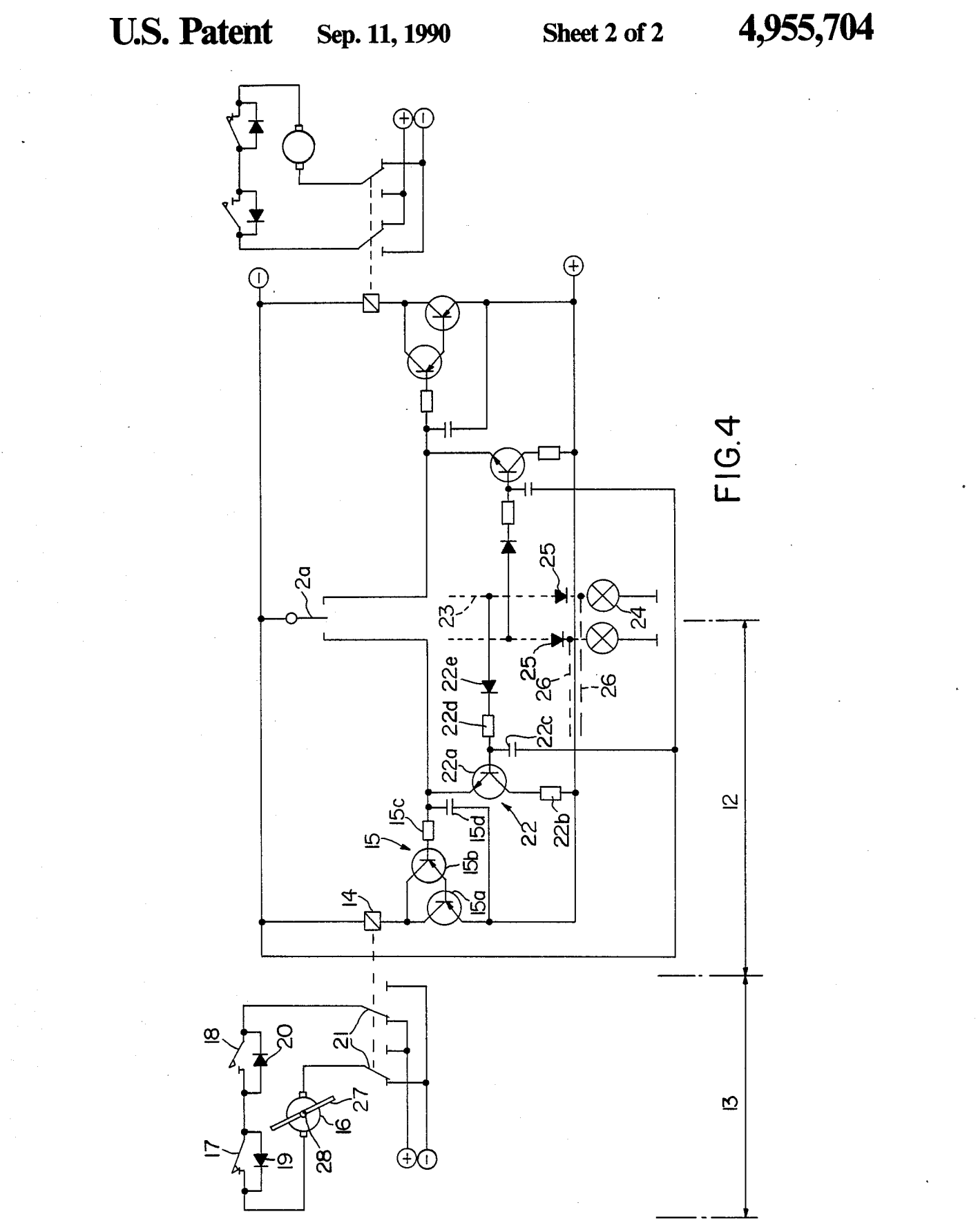

Referring now to FIG. 4, the left electrical actuating means comprises circuits 12 and 13. The left and right actuating means are identical, so for simplicity only the left will be described.

Circuit 12 consists of a relay 14 and a control system 15 for comprising two transistors 15a and 15b, a resistor 15c and a capacitor 15d. When switch means 2a is brought into contact with the left electrical actuating means control system 15 responds to the duration for which switching mechanism 2a remains in contact with the left electrical actuating means by switching relay 14 on for a predetermined minimum period of time in the event of very brief contact, e.g. two seconds, or leaving relay 14 on for a correspondingly longer period of time in the event of sustained contact.

Circuit 13 comprises a bi-directional motor 16 which shifts an outside rearview mirror 27 about a substantially vertical axis 28, two on-off switches 17 and 18 bridged by diodes 19 and 20 to limit the field of movement of the mirror, and switching contacts 21 actuated by relay 14.

As shown in FIG. 4, there is no current flowing through motor 16. If relay 14 is switched on, switching contacts 21 are to the right, causing a positive to negative current flow over motor 16, closed switch 17, and diode 20, thereby shifting the mirror. When the mirror reaches a pre-determined shifted position it opens switch 17, closes switch 18 and the motor stops. As long as relay 14 remains on, the mirror stays in its shifted position. When relay 14 is turned off, switching contacts 21 return to their original position, and current flows over closed switch 18, diode 19, and motor 16 to move the mirror back to its original position. Switch 18 is then opened, switch 17 is closed, and the mirror is ready to be shifted again.

Also shown in FIG. 4 as part of the left electrical actuating means are a switching element 22 connecting the circuit 12 with a branch 23. Switching element 22 comprises transistors 22a, resistors 22b and 22d, capacitor 22c and diode 22e. Branch 23 is connected to a right turn signal light 24. When current is flowing through the turn signal light 24 switching element 22 blocks activation of control system 15 to prevent inadvertent shifting of the left side mirror during manual shut-off of the turn signal. Diodes 25 ensure that the outside rearview mirrors can be shifted while current is flowing to flashing hazard lights (not shown) over connections 26.

OPERATION

If the driver of a vehicle wishes to check for other vehicles which may pose a hazard during a driving maneuver such as changing lanes or merging with traffic, he glances into an outside rearview mirror. This, however, leaves the driver with a blind spot where there may or may not be an unseen vehicle. Utilizing the present invention to check this blind spot, the driver merely presses a switch mechanism on the end of the turn signal lever arm. The appropriate mirror shifts to give him a clear view of the blind spot. The driver has the option of pressing the switch briefly for a two-second view, or holding it down longer for a sustained view. Both of these operations can be accomplished with or without simultaneous actuation of the turn signal. When the shift is completed, the mirror automatically returns to its original position.

I claim:

1. A shiftable outside mirror for use on a vehicle having a turn signal lever arm and switch means operable to shift said mirror, wherein the improvement comprises:

said switch means being pivotally mounted on said turn signal lever arm, pivotal relative to said turn signal lever arm in a plane substantially parallel to the plane of motion of said turn signal lever arm from a rest position to an activated position in which the mirror is shifted;

said switch means being movable with said turn signal lever arm when in said rest position such that only a turn signal is actuated;

said switch means being movable with said turn signal lever arm when in said activated position such that said mirror is shifted and a corresponding turn signal is actuated, and said shiftable outside mirror having a planar mirror element and motor means for rotating said element about an essentially vertical axis.

2. Apparatus as defined in claim 1 wherein the longitudinal axis of said switch means in its rest position is essentially a continuation of the longitudinal axis of said turn signal lever arm.

3. Apparatus as defined in claim 2 wherein an end portion of said turn signal lever arm and an end portion of said switch means are formed ton interfittingly engage each other, with spring means engaging both end portions.

4. Apparatus as defined in claim 3 wherein said spring means comprises a U-shaped spring having two free ends and a base, the free ends engaging said end portion of said switch means, said base engaging said end portion of said turn signal lever arm.

5. Apparatus as defined in claim 3 wherein said spring means biases said switch means to said rest position, the force required to move said switch means from said rest position being less than the force required to move said turn signal lever arm.

6. Apparatus as defined in claim 3 wherein said end portion of said switch means comprises two opposed, curved tongue portions surrounding said end portion of the turn signal lever arm.

7. Apparatus as defined in claim 6 wherein an elastic cover covers the interfitting engagement of said switch means and said turn signal lever arm.

8. Apparatus as defined in claim 6 wherein the end of at least one of said tongue portions is provided with at least one electrical contact, said turn signal lever arm adjacent said tongue portion is also provided with at least one electrical contact, said electrical contact on said tongue portion and said electrical contact on said turn signal lever arm engaging upon pivoting of said switch means.

9. Apparatus as defined in claim 8 wherein the position of said outside mirror is shifted in response to said switch means by way of electrical actuating means having a first circuit comprising said electrical contact on said tongue portion of said switch means, said electrical contact on said turn signal lever arm, a relay, and a control system, and a second circuit comprising a motor rotatable in two directions connected to said outside mirror for the purpose of shifting said outside mirror, two shift field limit switches to limit the shift field of the mirror, and two motor switches actuated by said relay to turn said motor on and off;

said control system operative to turn said relay on for a preset period of time in response to a brief contact between said electrical contact on said tongue portion of said switch means and said electrical contact on said turn signal lever arm, and a correspondingly longer period of time for more sustained contact.

10. Apparatus as defined in claim 9 wherein said first circuit is electrically connected to a branch circuit comprising the opposite side turn signal by means of a branch circuit switch in such a manner that said outside mirror cannot be shifted when current is flowing through said branch circuit.

11. For use in combination with a vehicle having a turn signal actuator:
   a rearview mirror for outside mounting on a motor vehicle having a planar mirror element and motor means for rotating said element about an essentially vertical axis;
   motor means connected to said mirror for shifting same from one viewing angle to another;
   switch means pivotally mounted on said turn signal actuator, pivotable independently thereof to actuate said motor means; and
   means connecting said motor means to the turn signal actuator such that operation of said actuator simultaneously operates said motor means and a corresponding turn signal.

12. A motor vehicle outside rearview mirror assembly for use in combination with a turn signal actuator lever comprising:
   a rearview mirror having a planar mirror element and a motor for rotating the element about an essentially vertical axis; and
   a manually-actuable switch electrically connected to said motor and being mechanically mounted on said actuator lever so as to be movable both independently thereof and simultaneously therewith, whereby said lever and said switch are selectively simultaneously operable such that said mirror is shifted and a corresponding turn signal is actuated.

13. Apparatus as defined in claim 12 wherein said switch is mounted so as to form an extension of said lever.

14. A shiftable outside mirror for use on a vehicle having a turn signal lever arm and switch means operable to shift said mirror, wherein the improvement comprises:
   said switch means being pivotally mounted on said turn signal lever arm, pivotal relative to said turn signal lever arm in a plane substantially parallel to the plane of motion of said turn signal lever arm from a rest position to an activated position in which the mirror is shifted;
   said switch means being movable with said turn signal lever arm when in said rest position such that only a turn signal is actuated;
   said switch means being movable with said turn signal lever arm when in said activated position such that said mirror is shifted and corresponding turn signal is actuated, said shiftable outside mirror having a planar mirror element and motor means for rotating said element about an essential vertical axis; wherein
   the longitudinal axis of said switch means in its rest position is essentially a continuation of the longitudinal axis of said turn signal lever arm, such that an end portion of said turn signal lever arm and an end portion of said switch means are interfittingly engaged by spring means engaging both of said end portions, said spring means comprising a U-shaped spring having two free ends and a base, the free ends engaging said end portion of said switch means, said base engaging said end portion of said turn signal lever arm.

15. Apparatus as defined in claim 14, wherein said spring means biases said switch means to said rest position, the force required to move said switch means from said rest position being less than the force required to move said turn signal lever arm.

16. Apparatus as defined in claim 14, wherein said end portion of said switch means comprises two opposed, curved tongue portions surrounding said end portion of the turn signal lever arm.

17. Apparatus as defined in claim 16, wherein an elastic cover covers the interfitting engagement of said switch means and said turn signal lever arm.

18. Apparatus as defined in claim 16, wherein the end of at lest one of said tongue portions is provided with at least one electrical contact, said turn signal lever arm adjacent said tongue portion is also provided with at least one electrical contact, said electrical contact on said tongue portion and said electrical contact on said turn signal lever arm engaging upon pivoting of said switch means.

19. Apparatus as defined in claim 18, wherein the position of said outside mirror is shifted in response to said switch means by way of electrical actuating means having a first circuit comprising said electrical contact on said tongue position of said switch means, said electrical contact on said turn signal lever arm, a relay, and a control system, and a second circuit comprising a motor rotatable in two directions connected to said outside mirror for the purpose of shifting said outside mirror, two shift field limit switches to limit the shift field of the mirror, and two motor switches actuated by said relay to turn said motor on and off;
   said control system operative to turn said relay on for a preset period of time in response to a brief contact between said electrical contact on said tongue portion of said switch means and said electrical contact on said turn signal lever arm, and a correspondingly longer period of time for more sustained contact.

20. Apparatus as defined in claim 19, wherein said first circuit is electrically connected to a branch circuit comprising the opposite side turn signal by means of a branch circuit switch in such a manner that said outside mirror cannot be shifted when current is flowing through said branch circuit.

* * * * *